United States Patent [19]

Granberg

[11] Patent Number: 4,651,714
[45] Date of Patent: Mar. 24, 1987

[54] HIGH EFFICIENCY WATER HEATER

[75] Inventor: Dirk N. Granberg, Brookfield, Wis.

[73] Assignee: A. D. Smith Corporation, Milwaukee, Wis.

[21] Appl. No.: 662,371

[22] Filed: Oct. 18, 1984

[51] Int. Cl.$^4$ .................... A47J 27/06; A47J 27/16; F22B 7/12
[52] U.S. Cl. .................. 126/378; 126/391; 126/344; 122/149; 122/182 T
[58] Field of Search ............... 126/378, 391, 392, 344, 126/110 R; 122/142, 149, 182 R, 182 T; 431/19

[56] References Cited

U.S. PATENT DOCUMENTS

| | | | |
|---|---|---|---|
| 1,974,288 | 9/1934 | Nigh | 122/149 |
| 2,127,445 | 8/1938 | Hardgrove | 431/19 |
| 2,146,565 | 2/1939 | Curtis | 122/149 |
| 2,479,042 | 8/1949 | Gaines | 122/17 |
| 3,167,066 | 1/1965 | Hughes | 126/350 |
| 3,238,928 | 3/1966 | Phillips | 122/149 |
| 3,507,481 | 4/1970 | Hemmert | 126/110 R |
| 3,823,704 | 7/1974 | Daugirda et al. | 126/392 |
| 4,090,476 | 5/1978 | Rybar et al. | 122/367 |
| 4,164,210 | 8/1979 | Hollowell | 126/110 R |
| 4,275,705 | 6/1981 | Schaus et al. | 126/110 |
| 4,303,042 | 12/1981 | Sumiyoshi | 122/17 |
| 4,314,542 | 2/1982 | Brat Ko | 126/110 R |
| 4,425,902 | 1/1984 | Thouault et al. | 126/360 |

Primary Examiner—Larry Jones
Attorney, Agent, or Firm—Andrus, Sceales, Starke & Sawall

[57] ABSTRACT

A water heater having improved efficiency. The water heater includes a tubular member that is mounted in an opening in the side of the tank and extends horizontally across the lower portion of the tank. The tubular member defines a combustion chamber. An elongated burner is positioned within the combustion chamber and includes an inner metal support screen and an outer layer of woven ceramic fabric. A fuel-air mixture is supplied to the interior of the burner and the fuel is ignited on the outer surface of the burner with heat being transferred to the water in the tank. The waste gases of combustion are discharged from the inner end of the tubular member and are directed into a series of heat exchange tubes which are positioned beneath the combustion chamber. The hot waste gases passing through the tubes act to transfer further heat to the water in the tank. The outer ends of the tubes extend through the wall of the tank and communicate with a collector which is connected to a flue. A condensate trap is mounted in the collector and serves to collect and discharge condensate, while preventing discharge of the waste gases of combustion to the atmosphere.

7 Claims, 4 Drawing Figures

HIGH EFFICIENCY WATER HEATER

BACKGROUND OF THE INVENTION

In the conventional gas fired water heater, a gas burner is located beneath the lower head of the tank and waste gases of combustion are discharged from the burner through one or more vertical flues that extend upwardly through the tank. With this type of construction, heat is transferred from the burner through the lower head to heat the water in the tank, and heat is also transferred to the water from the waste gases passing upwardly through the flues.

When the water heater is not in operation, there will be a flow of air by convection through the flues with the resultant transfer of heat from the heated water in the tank to the air passing upwardly through the flues. This can result in considerable heat loss during standby periods. Because of this, the conventional water heater, utilizing internal flues, has an in-service efficiency of less than 70%.

The typical gas-fired water heater has a relatively large diameter flue which is normally connected to a chimney. To prevent blow-out of the pilot light, a burner flame due to downdrafts, the flue is provided with a draft hood. The use of a draft hood can also result in a considerable loss of heat from the building in that heated air from the building can continually flow by convection through the draft hood and the flue to the exterior, with the result that cooler outside air will necessarily be drawn into the building to replace the warm air that is lost through the flue.

Furthermore, there is a tendency in the conventional water heater utilizing internal flues for the water to stratify and be overheated. Heated water will rise to the top of the tank by convection and during periods of short intermittent draws, the heated in the upper end of the tank may be overheated by heat transfer from the hot flue gases passing through the internal flues.

With commerical water heaters, where it is desired to heat the water to sanitizing temperatures of 180° F., it is difficult to heat the water to this temperature without overheating and resultant actuation of the temperature pressure relief valve.

In an attempt to increase the efficiency of the water heater, submersible chamber heaters have been recently developed. With heaters of this type, the burner, instead of being mounted below the lower head, is positioned in a closed combustion chamber located within the lower portion of the tank. Waste gases are forced through or withdrawn from the combustion chamber by a blower and can be discharged directly to the atmosphere.

As submersible chamber heaters of this type do not include internal flues, the standby loss is substantially reduced, thereby increasing service efficiency. Locating the combustion chamber low in the tank also prevents overheating of the water in the upper end of the tank.

Furthermore, as water heaters of this type employ a forced or induced flow through the combustion chamber, the waste gases can be discharged directly to the atmosphere without the need of a chimney.

SUMMARY OF THE INVENTION

The invention is directed to a submersible chamber water heater having improved efficiency. In accordance with the invention, the heating assembly comprises a generally horizontal tubular member which is mounted in an opening in the side wall of the tank and extends across the lower portion of the tank above the lower head. The tubular member defines a combustion chamber, and an elongated burner is mounted within the combustion chamber.

The burner is preferably constructed with an inner metal supporting screen and an outer layer of woven ceramic material. A mixture of fuel and air is supplied to the outer end of the burner and passes through the ceramic fabric layer where it is ignited on the outer surface of the burner. Heat from the combustion process is transferred through the tubular member to the water in the lower portion of the tank. The waste gases of combustion flow outwardly from the inner end of the combustion chamber and are directed downwardly by a dome-shaped deflector into the inner ends of a plurality of generally parallel heat exchanger tubes that are located beneath the combustion chamber. Waste gases flowing through the heat exchanger tubes will transfer additional heat to the water in the lower portion of the tank.

The outer ends of the heat exchanger tubes extend through the wall of the tank and communicate with a collector which is mounted on the exterior of the tank. The collector has an outlet through which the waste gases are discharged to the atmosphere through an exhaust system.

As there can be considerable condensate generated due to the cooling of the waste gases in the heat exchanger, a condensate trap is mounted in the lower portion of the collector. The condensate trap permits the discharge of condensate to a drain line while preventing the discharge of the waste gases to the atmosphere.

As a feature of the invention, flow through the combustion chamber and heat exchanger is induced by a blower which is located upstream of the burner. The outlet of the blower is provided with a restrictor having an orifice of fixed cross sectional area. The area of the orifice is pre-set and accurately controls the fuel-air ratio.

The combination of the burner along with the heat exchanger provides improved efficiency for the water heating operation. As no internal flues are incorporated in the water heater, standby heat loss is reduced, thereby resulting in an in-service efficiency of 90% or greater.

As the water heater of the invention does not utilize internal flues, stacking or stratification is virtually eliminated and this allows a single temperature control to be used for the heater.

As the burner and heat exchanger constitutes an integral heating unit, it can be readily disassembled from the tank for maintenance or replacement, or for removal of lime build-up or other sediment from the tank.

The heating unit also has improved safety in that combustion is confined within the combustion chamber which is located solely within the tank itself.

Moreover, the heating unit incorporates an integral condensation collection and draining system and promotes direct venting and direct exhaust of the gases.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
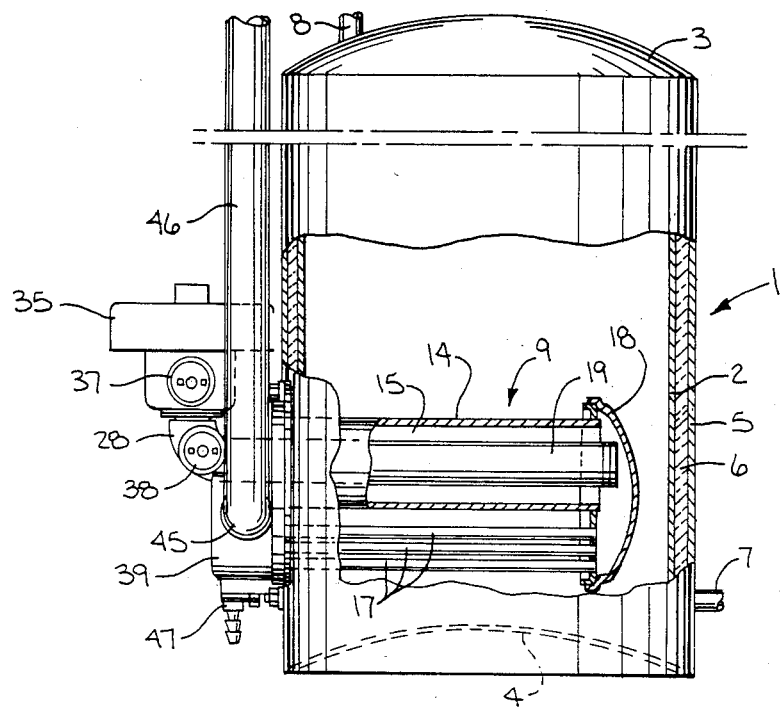
FIG. 1 is a side elevation of a water heater incorporating the heating unit of the invention with parts broken away in section.

FIG. 1 shows a water heater 1 composed of a generally cylindrical tank 2 which is enclosed by a dome-shaped upper head 3 and a dome-shaped lower head 4. The cylindrical tank 2, as well as the heads 3 and 4 are preferably formed of corrosion resistant construction, such as glass coated steel.

An outer jacket 5 is spaced outwardly from the tank 2 and upper head 3 and a layer of insulating material 6, which can be a fibrous or a foam-type insulation, is positioned between jacket 5 and tank 2 and head 3.

Cold water to be heated is introduced into the lower portion of the tank through an inlet nipple 7, while heated water is withdrawn from the upper end of the tank through an outlet 8.

In accordance with the invention, water in the tank is heated by a heating unit indicated generally by 9, which is mounted in an opening in the cylindrical tank 2 and is positioned above lower head 4.

Figure 2:
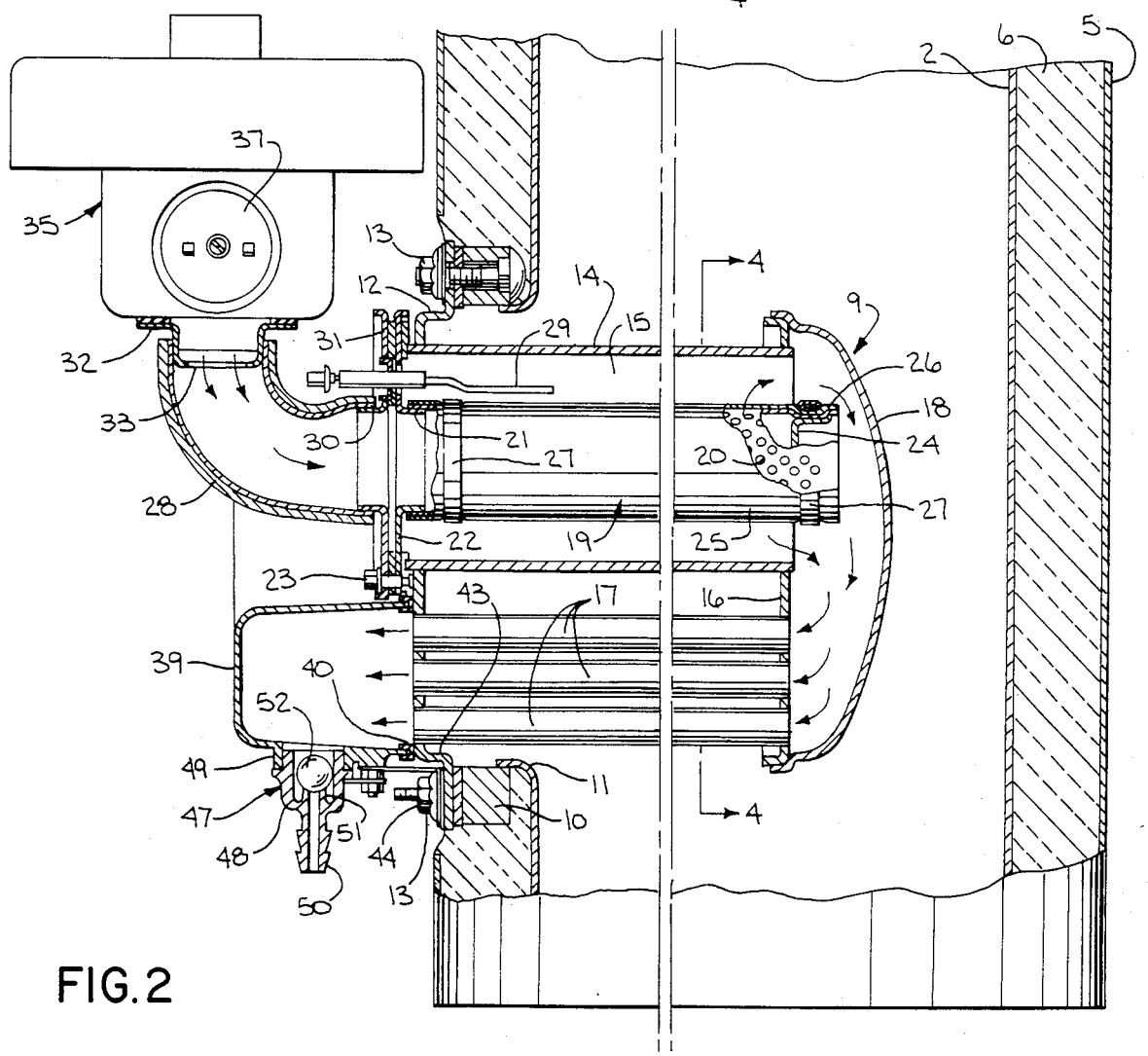
FIG. 2 is an enlarged vertical section of the heating unit.
Figure 3:
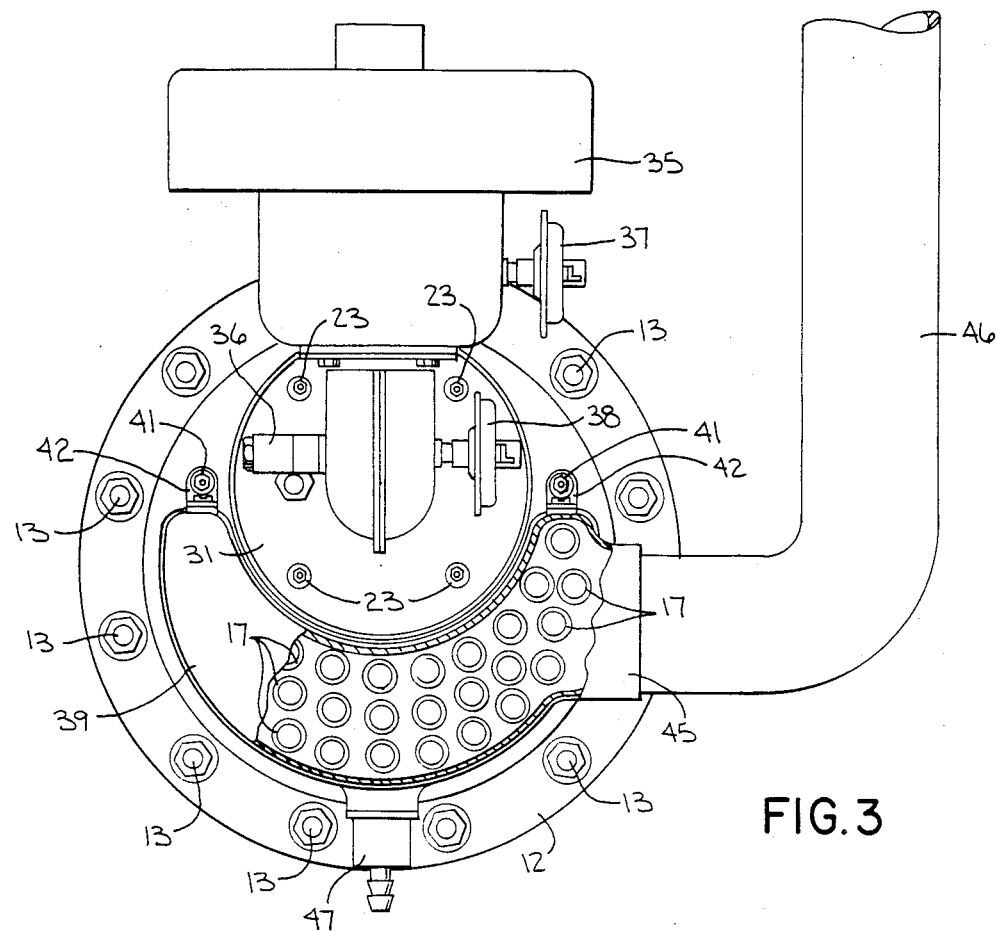
FIG. 3 is an end view of the heating unit with parts broken away.
Figure 4:
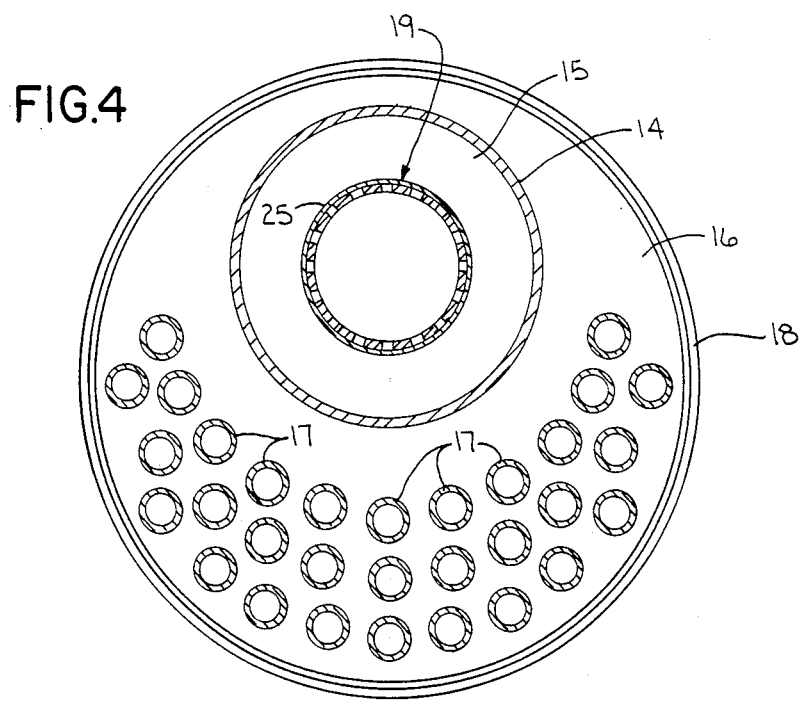
FIG. 4 is a section taken along line 4—4 of FIG. 2.

To mount the heating unit 9 to tank 2, a reinforcing ring 10 is welded to an outwardly extending flange 11 that borders an opening in tank 2. The heating unit 9 includes a mounting plate 12 which is secured to the reinforcing ring 10 through a series of circumferentially spaced fasteners 13. Mounted within an opening in mounting plate 12 is a tubular member 14 which defines a combustion chamber 15. Tubular member 14 extends horizontally across tank 2 and the inner end of tubular member 14 is welded within an opening in end plate 16. In addition, a plurality of heat exchanger tubes 17 are positioned generally beneath tubular member 14 and are welded within aligned openings in mounting plate 12 and end plate 16. As best shown in FIGS. 2 and 3, the heat exchanger tubes 17 are disposed in parallel relation and the bundle of tubes extends approximately 180° around the member 14.

Heating unit 9 also includes a generally dome-shaped deflector 18 which is secured to the peripheral edge of end plate 16, and waste gases of combustion from the combustion chamber are directed by the deflector 18 into the heat exchanger tubes 17, as will be hereinafter described.

Heating unit 9 also includes a burner 19 which is mounted within combustion chamber 15. Burner 19 can have a construction similar to that disclosed in the copending U.S. application Ser. No. 580,686, filed Feb. 15, 1984. In general, burner 19 includes a cylindrical inner metal screen or support 20 and the outer end of screen 20 is secured to the annular flange 21 of mounting ring 22. Mounting ring 22 is attached to mounting plate 12 through a series of studs 23.

The inner end of screen 20 is closed off by a closure plate 24, so that a fuel-air mixture entering the end of the burner 19 will flow outwardly through screen 20 and through an outer fabric sleeve 25 which is supported on screen 20. The fabric sleeve 25 can be made of woven ceramic fabric, similar to that described in the aforementioned U.S. patent application, Ser. No. 580,686.

To secure the fabric sleeve 25 around the screen 20, the ends of screen 20 can be provided with circumferential grooves 26, and tie rings or clamps 27 mate with the grooves 26 to secure the sleeve to the screen. As disclosed in the aforementioned patent application, the clamps are composed of an inner metal tie located within an outer ceramic fabric ring.

A fuel-air mixture is supplied to radiant burner 19 through a tube 28, and the fuel is ignited on the outer surface of burner 19 by a conventional igniter 29 that is mounted within an opening in mounting ring 22.

One end of the supply tube 28 is secured to a flange 30 that extends outwardly from mounting ring 31, and mounting ring 31 is secured flatwise to mounting ring 22 through the studs 23. Suitable gaskets can be interposed between the rings 22 and 31, as well as between the ring 22 and the end of the tubular member 14.

As best shown in FIG. 2, the outer end of tube 28 is secured around 32. The central portion of restrictor 32 is formed with an orifice or opening 33 having a cross-sectional area which is sized to provide the proper air-fuel mixture being fed to burner 19. The upper flange 34, of restrictor 32 is secured to the undersurface of a blower 35. Blower 35 is a conventional type and air is discharged from the blower through restrictor 32 and supply tube 28 to the burner 19.

A fuel, such as natural or propane gas, is supplied to the burner 19, through a gas inlet nipple 36, which is connected to the central portion of supply tube 28, as best shown in FIG. 3. The inlet nipple 36, is connected to a conventional gas valve. With this constuction, the air being delivered by blower 35 will be mixed with the fuel in the supply tube 28 and the mixture delivered to the burner 19 where the fuel will be ignited on the outer surface of the burner which heats tubular member 14 to thereby heat the water. The waste gases of combustion being discharged from the inner end of tubular member 14, will be deflected downwardly by deflector 18 and pass through the bundle of heat exchanger tubes 17 where additional heat will be transferred from hot waste gases to the surrounding water in the tank.

To increase the turbulence of the gases flowing within heat exchanger tubes 17 and thereby increase the rate of heat transfer, a baffle or turbulator, not shown, can be in each tube 17. The turbulators increase the turbulence of the waste gas flowing within the tubes to thereby increase the efficiency of heat transfer.

Blower 35 causes a draft through the radiant burner 19 and heat exchanger tubes 17. It is preferred that the blower be positioned upstream of the radiant burner 19, for in this position it will not be contacted by the highly corrosive waste gases of combustion and can more accurately, in combination with restrictor 32, control the fuel-air ratio for the combustion process.

A conventional pressure switch 37 is mounted in communication with blower 35 and is responsive to a predetermined pressure in the outlet of the blower. If the pressure falls beneath the predetermined setting, indicating that the blower is not operating properly, pressure switch 37 will prevent operation of the gas valve so that fuel will not be introduced into the system.

In addition to the pressure switch 37, a second pressure switch 38 can be mounted in the tube 28. The region downstream of orifice 33 will have a relatively low pressure during normal operation of blower 35. Switch 38 is adapted to cut off operation of the entire system if the pressure in this region increases beyond a predetermined setting, indicating a blockage downstream in the system.

Cooling of the waste gases of combustion in heat exchanger tubes 17 can generate a substantial quantity of condensation and the latent heat of vaporization will be transferred to the water in the tank to further increase the efficiency of the operation. The waste gases and condensate being discharged from tubes 17 are collected in a generally U-shaped collector 39 which is attached to the mounting plate 12 and communicates with the outlet or downstream ends of the heat exchanger tubes 17. Tubes 17 slope downwardly toward collector 39. To seal the joint between collector 39 and mounting plate 12, a gasket 40 is interposed between the edge of the collector and the face of the mounting plate.

Collector 39 is secured to mounting plate 12 by a fasteners 41 which extend through lugs or ears 42 attached to the upper ends of collector 39. In addition, a bracket 43 is mounted to the undersurface of the collector and is secured by fastener 44 to the mounting ring 12. The waste gases entering collector 39 are discharged through an outlet 45 which connected through flue 46 to the atmosphere.

To drain condensate from the collector 39, a condensate trap 47 is mounted within an opening in the lower surface of collector 39. The condensate trap 48 can be constructed in the manner shown in copending U.S. patent application Ser. No. 616,018, filed June 4, 1984.

As shown in FIG. 2, the upper end of the body 48 of trap 47 is sealed within an opening bordered by flange 49 on collector 39. The lower portion of body 48 defines an outlet 50 having a raised seat 51, and a ball 52, having a specific gravity less than water, rests on the seat to close off the outlet 50. When the body 48 fills with condensate, ball 52 will float, opening outlet 50 and enabling the condensate to drain through the outlet to a collection site. The condensation trap 47 permits the automatic discharge of condensate from the collector 39, but prevents waste gases of combustion from passing through the trap to the atmosphere.

Due to the combination of burner 19 and the heat exchanger, the water heater has a high in-service efficiency, above 90%.

As interior flues are eliminated, there is no heat loss to air moving upwardly through the flues by convection during stand-by periods of non-service and this substantially improves the overall efficiency of the heater.

The elimination of the interior flues also prevents stratification and overheating of the water in the upper end of the tank and thereby enables the water heater to be operated with a single temperature control.

The air-fuel mixture is moved through the burner 19 and heat exchanger tubes 17 by a blower, so that the waste gases can be discharged directly to the exterior without the need of a chimney.

Because the heating unit 9 is located in the tank 1 rather than being positioned beneath the bottom head 4, the buildup of scale on the bottom head, in locations having a high lime content in the water, will not effect the efficiency of the heating unit.

As the entire heating unit is an integral unit, it can be readily disassembled from the heater for repair or replacement, or for cleaning of scale or sediment from the bottom head of the tank.

Various modes of carrying out the invention are contemplated as being within the scope of the following claims particularly pointing out and distinctly claiming the subject matter which is regarded as the invention.

I claim:

1. A high efficiency water heating apparatus, comprising a tank to contain water to be heated, means for introducing water into the tank, means for withdrawing heated water from the upper end of the tank, heating means for heating the water in the tank and comprising a tubular member disposed in an opening in the side wall of the tank and extending across the tank, a burner disposed within the tubular member, means for supplying a mixture of fuel and air to said burner, means for igniting said fuel mixture on the outer surfaces of said burner, heat exchange means disposed beneath said tubular member in contact with said water and spaced above the lower end of the tank, conducting means interconnecting the inner end of the tubular member and said heat exchange means for conducting waste gases of combustion from said tubular member to said heat exchange means, said heat exchange means comprising a bundle of generally parallel tubes to conduct said waste gases, said bundle extending circumferentially around the lower portion of said tubular member, heat being transferred from the waste gases flowing in said tubes to the water in the tank to cool said waste gases and generate condensate, a collection chamber connected to the downstream ends of said tubes, condensate collection means communicating with said collection chamber for collecting and discharging said condensate and preventing discharge of said waste gases with said condensate, and gas discharge means connected to said tubes for discharging said waste gases to the atmosphere.

2. The water heater of claim 1, wherein said burner is elongated and comprises an inner perforated metal support member and an outer layer of woven ceramic fabric, said fuel being combusted on the outer surface of said fabric.

3. A high efficiency water heater, comprising a tank to contain water to be heated, means for introducing water into the tank, means for withdrawing heated water from the upper portion of the tank, an integral preassembled heating unit disposed within the tank, said heating unit including mounting means for removably securing said heating unit to said tank and bordering an opening in said tank, said heating unit including a tubular member carried by said mounting means and extending horizontally within said tank, said tubular member defining a combustion chamber, an elongated burner disposed within said combustion chamber and carried by said mounting means, a bundle of heat exchanger tubes disposed in parallel relation beneath said tubular member, the outer ends of said tubes being secured to said mounting means, supply means for supplying a mixture of fuel and air to said burner and carried by said mounting means, ignitor means carried by said mounting means for igniting said fuel, igniting of said fuel generating heat with said heat being transferred to the water in said tank, said heating unit also including deflector means connecting the inner ends of said tubes for delivering the waste gases of combustion from said combustion chamber to said tubes, said deflector means being spaced inwardly of the tank wall and disposed in contact with the water in the tank, gas discharge means including a collection chamber carried by said mounting means and communicating with the outer ends of said tubes for collecting the waste gases discharged from said tubes and discharging said waste gases to the atmosphere, and means connected to said collection chamber for discharging condensate generated by cooling of said waste gases and preventing discharge of said waste gases with said condensate.

4. The water heater of claim 3, wherein said supply means includes a supply tube secured to said mounting means and having one end communicating with said burner, and an air blower having a discharge outlet connected to the opposite end of said supply tube.

5. The water heater of claim 4, and including orifice means disposed in said supply tube between said blower and said burner and having a reduced cross sectional area for controlling the fuel-air ratio.

6. The water heater of claim 3, wherein said tubes are in direct contact with the water in said tank and said bundle extends around the lower portion of said tubular member.

7. The water heater of claim 6, wherein said bundle extends approximately 180° around said tubular member.

* * * * *

UNITED STATES PATENT AND TRADEMARK OFFICE
CERTIFICATE OF CORRECTION

PATENT NO. : 4,651,714
DATED : March 24, 1987
INVENTOR(S) : DIRK N. GRANBERG

It is certified that error appears in the above-identified patent and that said Letters Patent is hereby corrected as shown below:

Title Page

At "[73] Assignee:" Cancel "A. D. SMITH CORPORATION" and substitute therefor ---A. O. SMITH CORPORATION---.

Signed and Sealed this

Twenty-second Day of March, 1988

Attest:

DONALD J. QUIGG

*Attesting Officer*   *Commissioner of Patents and Trademarks*